US006477489B1

(12) United States Patent
Lockwood et al.

(10) Patent No.: US 6,477,489 B1
(45) Date of Patent: Nov. 5, 2002

(54) METHOD FOR SUPPRESSING NOISE IN A DIGITAL SPEECH SIGNAL

(75) Inventors: Philip Lockwood, Vaureal (FR); Stéphane Lubiarz, Osny (FR)

(73) Assignee: Matra Nortel Communications (FR)

( * ) Notice: Subject to any disclaimer, the term of this patent is extended or adjusted under 35 U.S.C. 154(b) by 0 days.

(21) Appl. No.: 09/509,145

(22) PCT Filed: Sep. 16, 1998

(86) PCT No.: PCT/FR98/01980

§ 371 (c)(1), (2), (4) Date: Jun. 5, 2000

(87) PCT Pub. No.: WO99/14738

PCT Pub. Date: Mar. 25, 1999

(30) Foreign Application Priority Data

Sep. 18, 1997 (FR) .......................................... 97 11643

(51) Int. Cl.[7] .......................... G10L 21/02; H04B 15/00

(52) U.S. Cl. .................... 704/200.1; 704/205; 704/226; 381/94.3

(58) Field of Search ............................. 704/200.1, 205, 704/207, 210, 226, 227, 228, 208; 381/94.1, 94.2, 94.3, 94.7

(56) References Cited

U.S. PATENT DOCUMENTS

| | | | | | |
|---|---|---|---|---|---|
| 5,151,941 | A | * | 9/1992 | Nishiguchi et al. | 704/230 |
| 5,228,088 | A | | 7/1993 | Kane et al. | |
| 5,400,409 | A | * | 3/1995 | Linhard | 381/92 |
| 5,450,522 | A | * | 9/1995 | Hermansky et al. | 704/200.1 |
| 5,469,087 | A | | 11/1995 | Eatwell | |
| 5,555,190 | A | | 9/1996 | Derby et al. | |
| 5,717,768 | A | * | 2/1998 | Laroche | 379/406.13 |
| 5,742,927 | A | * | 4/1998 | Crozier et al. | 704/209 |
| 5,839,101 | A | * | 11/1998 | Vahatalo et al. | 704/217 |
| 6,144,937 | A | * | 11/2000 | Ali | 704/226 |

FOREIGN PATENT DOCUMENTS

| | | |
|---|---|---|
| EP | 0 438 174 | 7/1991 |
| EP | 0 661 821 | 7/1995 |
| WO | 95/02930 | 1/1995 |

OTHER PUBLICATIONS

R Le Bouquin et al., <<Enhancement of Noisy Speech Signals: Application to Mobile Radio Communications>>, Speech Communication, Jan. 1996, vol. 18, No. 1, pp. 3–19.

S Nandkumar et al., <<Speech Enhancement Based on a New Set of Auditaury Constrained Parameters>>, Proceedings of the International Conference on Acoustics, Speech, Signal Processing, ICASSP 1994, Apr. 1994, vol. 1, pp. 1–4.

P Lockwood et al., <<Experiments with a Nonlinear Spectral Subtractor (NSS), Hidden Markov Models and the Projection, for Robust Speech Recognition in Cars>>, Speech Communication, Jun. 1992, vol. 11, No. 2/3, pp. 215–228.

* cited by examiner

*Primary Examiner*—Marsha D. Banks-Harold
*Assistant Examiner*—Martin Lerner
(74) *Attorney, Agent, or Firm*—Trop, Pruner & Hu, P.C.

(57) ABSTRACT

A spectral subtraction is effected including: a first subtraction step in which overestimates of the spectral component of the noise are taken into account, to obtain spectral components of a first noise-suppressed signal; the computation of a masking curve by applying an auditory perception model on the basis of the spectral components of the first noise-suppressed signal; and a second subtraction step in which a respective quantity depending on parameters including a difference between the overestimate of the corresponding spectral component of the noise and the computed masking curve is subtracted from each spectral component of the speech signal in the frame. The result of the spectral subtraction is transformed into the time domain to construct a noise-suppressed speech signal.

21 Claims, 7 Drawing Sheets

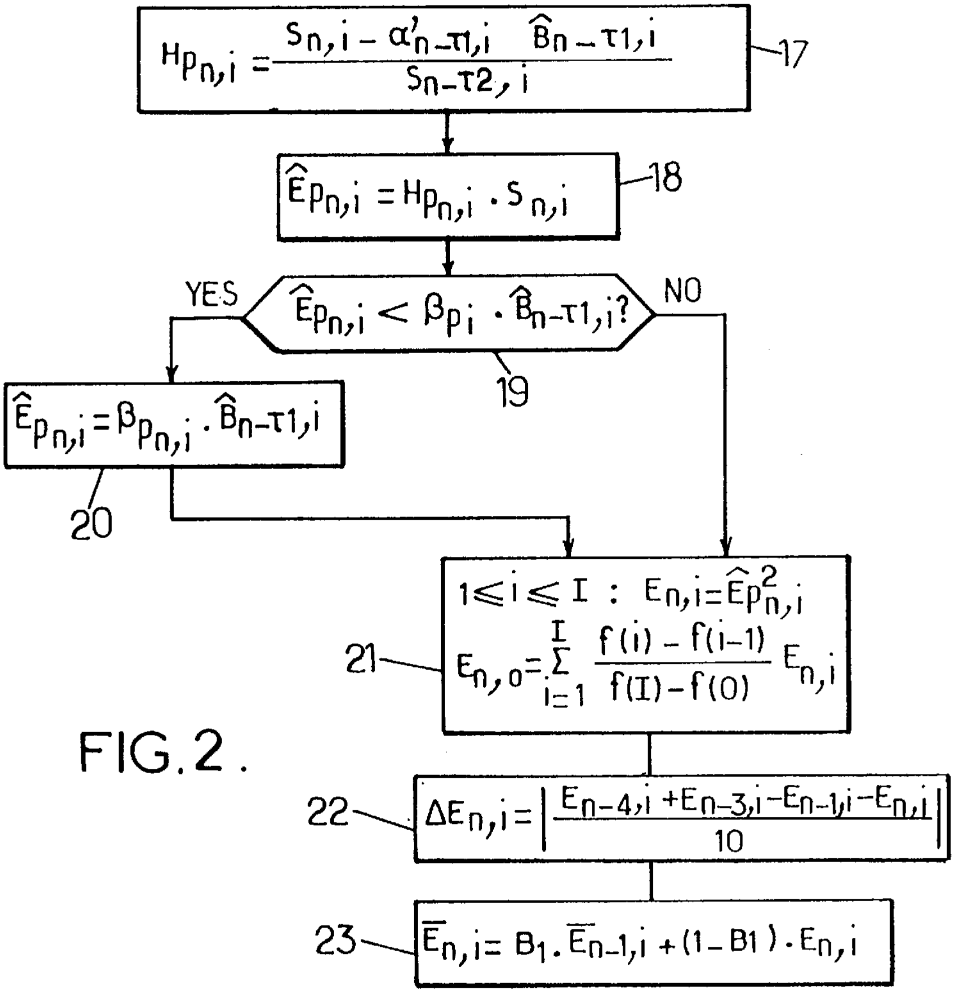
FIG. 2.
FIG. 4.
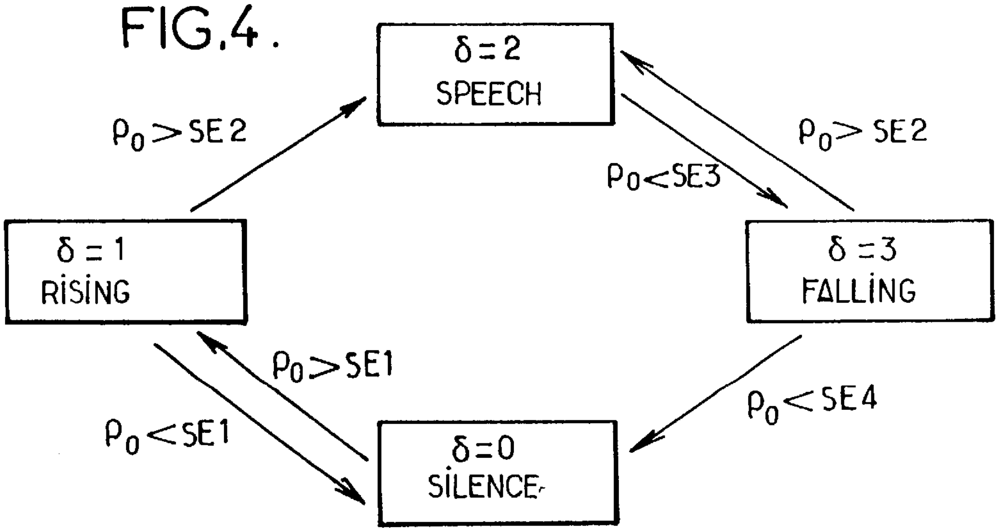

METHOD FOR SUPPRESSING NOISE IN A DIGITAL SPEECH SIGNAL

BACKGROUND OF THE INVENTION

The present invention relates to digital techniques for suppressing noise in speech signals. It relates more particularly to noise suppression by non-linear spectral subtraction.

Because of the widespread adoption of new forms of communication, in particular mobile telephones, communications are increasingly made in very noisy environments. The noise, added to the speech, then tends to interfere with the communication by preventing optimum compression of the speech signal and creating unnatural background noise. The noise makes understanding the spoken message difficult and tiring.

Many algorithms have been investigated in attempts to reduce the effects of noise in a communication. S. F. Boll ("Suppression of acoustic noise in speech using spectral subtraction", IEEE Trans. on Acoustics, Speech and Signal Processing, Vol. ASSP-27, No. 2, April 1979) has proposed an algorithm based on spectral subtraction. This technique consists of estimating the spectrum of the noise during phases of silence and subtracting it from the received signal. It reduces the received noise level. Its main defect is that it creates musical noise which is particularly bothersome because it is unnatural.

This work was taken up and improved on by D. B. Paul ("The spectral envelope estimation vocoder", IEEE Trans. on Acoustics, Speech and Signal Processing, Vol. ASSP-29, No. 4, August 1981) and by P. Lockwood and J. Boudy ("Experiments with a nonlinear spectral subtractor (NSS), Hidden Markov Models and the projection, for robust speech recognition in cars", Speech Communication, Vol. 11, June 1992, pages 215–228, and EP-A-0 534 837) and has significantly reduced the level of the noise whilst preserving its natural character. Moreover, this contribution had the merit of incorporating the principle of masking into the computation of the noise suppression filter for the first time. Based on this idea, a first attempt was made by S. Nandkumar and J. H. L. Hansen ("Speech enhancement on a new set of auditory constrained parameters", Proc. ICASSP 94, pages I.1–I.4) to use explicitly computed masking curves in the spectral subtraction. Despite the disappointing results of the above technique, this contribution had the merit of emphasizing the importance of not degrading the speech signal during noise suppression.

Other methods based on breaking the speech signal down into singular values, and thus on projecting the speech signal into a smaller space, were investigated by Bart De Moore ("The singular value decomposition and long and short spaces of noisy matrices", IEEE Trans. on Signal Processing, Vol. 41, No. 9, September 1993, pages 2826–2838) and by S. H. Jensen et al. ("Reduction of broad-band noise in speech by truncated QSVD", IEEE Trans. on Speech and Audio Processing, Vol. 3, No. 6, November 1995). The principle of the above technique is to consider the speech signal and the noise signal as totally decorrelated and to consider the speech signal to have sufficient predictability to be predicted on the basis of a restricted set of parameters. This technique produces acceptable noise suppression for highly voiced signals, but totally alters the nature of the speech signal. Faced with relatively coherent noise, such as vehicle tire or engine noise, the noise can be more easily predicted than the unvoiced speech signal. There is then a tendency to project the speech signal into part of the vector space of the noise. The method does not take the speech signal into account, in particular unvoiced speech areas where the predictability is low. Moreover, predicting the speech signal on the basis of a small set of parameters prevents all of the intrinsic richness of speech from being taken into account. The limitations of techniques based only on mathematical considerations and overlooking the particular nature of speech are clear.

Finally, other techniques are based on criteria of coherence. The coherence function is particularly well developed by J. A. Cadzow and O. M. Solomon ("Linear modeling and the coherence function", IEEE Trans. on Acoustics, Speech and Signal Processing, Vol. ASSP-35, No. 1, January 1987, pages 19–28), and its application to noise suppression has been investigated by R. Le Bouquin ("Enhancement of noisy speech signals: application to mobile radio communications", Speech Communication, Vol. 18, pages 3–19). This method is based on the fact that the speech signal is significantly more coherent than the noise if a plurality of independent channels is used. The results obtained appear to be fairly encouraging. However, this technique unfortunately requires a plurality of sound pick-up points, which is not always the case.

A main object of the present invention is to propose a new noise suppression technique which takes account of the characteristics of perception of speech by the human ear, so enabling efficient noise suppression without deteriorating the perception of the speech.

SUMMARY OF THE INVENTION

The invention therefore proposes a method of suppressing noise in a digital speech signal processed by successive frames, comprising the steps of:

- computing spectral components of the speech signal of each frame;
- computing, for each frame, overestimates of spectral components of the noise included in the speech signal;
- performing a spectral subtraction including at least a first subtraction step in which a respective first quantity dependent on parameters including the overestimate of the corresponding spectral component of the noise for said frame is subtracted from each spectral component of the speech signal of the frame, to obtain spectral components of a first noise-suppressed signal; and
- subjecting the result of the spectral subtraction to a transformation into the time domain to construct a noise-suppressed speech signal.

According to the invention, the spectral subtraction further includes the following steps

- computing a masking curve by applying an auditory perception model on the basis of spectral components of the first noise-suppressed signal;
- comparing overestimates of the spectral components of the noise for the frame to the computed masking curve; and
- a second subtraction step in which a respective second quantity depending on parameters including a difference between the overestimate of the corresponding spectral component of the noise and the computed masking curve is subtracted from each spectral component of the speech signal of the frame.

The second quantity subtracted can in particular be limited to the fraction of the overestimate of the corresponding spectral component of the noise which is above the masking curve. This approach is based on the observation that it is sufficient to suppress audible noise frequencies. In contrast, there is no utility eliminating noise masked by speech.

It is generally desirable to overestimate the spectral envelope of the noise so that the overestimate thereby obtained is robust to sudden variations of the noise. However, excessive overestimation usually has the drawback of distorting the speech signal. This affects the voiced character of the speech signal, eliminating some of its predictability. This drawback is very bothersome in telephony, since it is in the voiced areas that the speech signal then has the most energy. The invention greatly attenuates this drawback by limiting the subtracted quantity if the whole or part of a frequency component of the overestimated noise proves to be masked by the speech.

DESCRIPTION OF THE DRAWINGS

FIGS. 2 and 3 are flowcharts of procedures used by a vocal activity detector of the system shown in FIG. 1;

FIG. 4 is a diagram representing the states of a vocal activity detection automaton;

DESCRIPTION OF THE PREFERRED EMBODIMENTS

Figure 1:
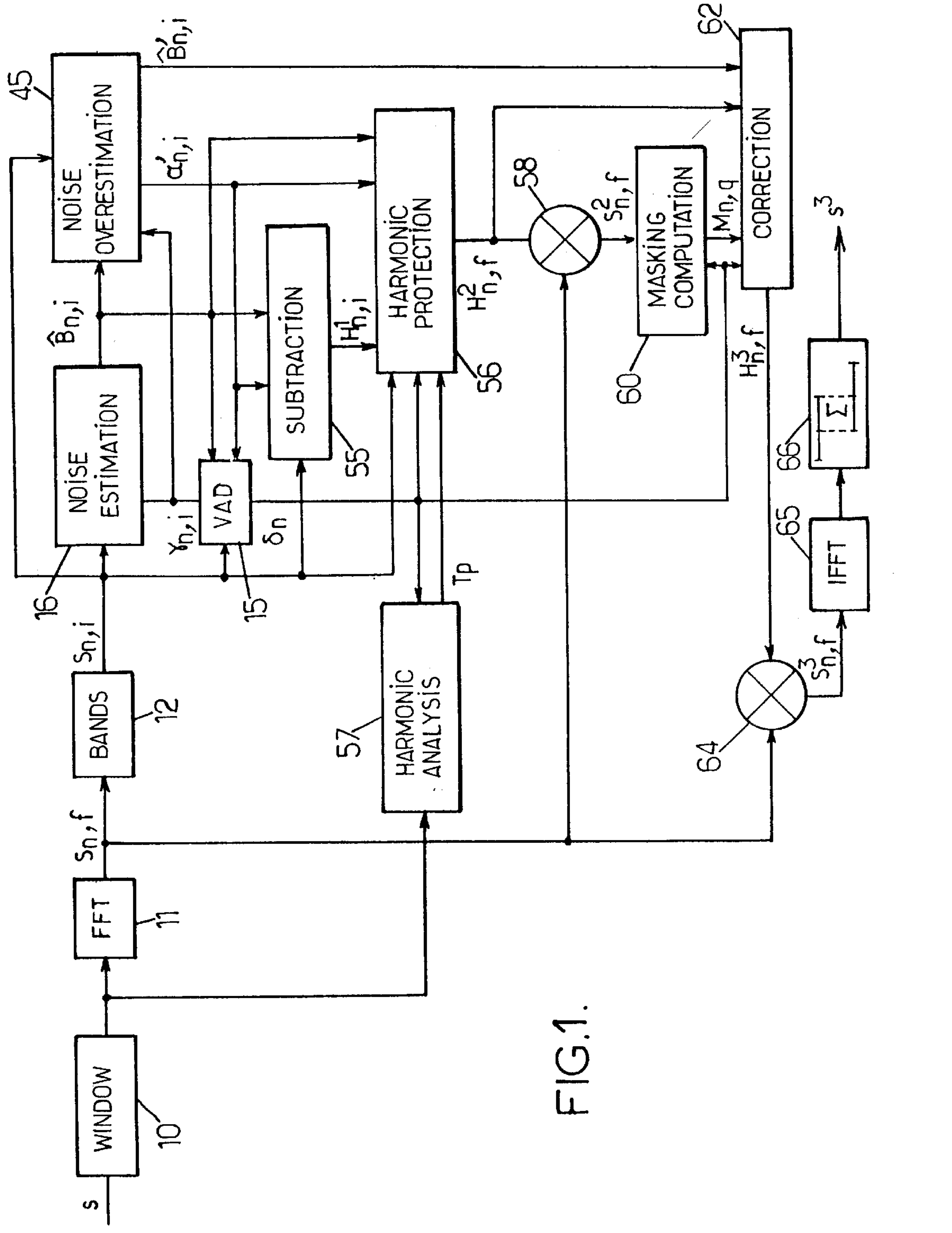
FIG. 1 is a block diagram of a noise suppression system implementing the present invention.

The noise suppression system shown in FIG. 1 processes a digital speech signal s. A windowing module 10 formats the signal s in the form of successive windows or frames each made up of a number N of digital signal samples. In the usual way, these frames can overlap each other. In the remainder of this description, the frames are considered to be made up of N=256 samples with a sampling frequency $F_e$ of 8 kHz, with Hamming weighting in each window and with 50% overlaps between consecutive windows, although this is not limiting on the invention.

The signal frame is transformed into the frequency domain by a module 11 using a conventional fast Fourier transform (FFT) algorithm to compute the modulus of the spectrum of the signal. The module 11 then delivers a set of N=256 frequency components $S_{n,f}$ of the speech signal, where n is the number of the current frame and f is a frequency from the discrete spectrum. Because of the properties of the digital signals in the frequency domain, only the first N/2=128 samples are used.

Instead of using the frequency resolution available downstream of the fast Fourier transform to compute the estimates of the noise contained in the signal s, a lower resolution is used, determined by a number I of frequency bands covering the bandwidth [0, $F_e/2$] of the signal. Each band i ($1 \leqq i \leqq I$) extends from a lower frequency f(i−1) to a higher frequency f(i), with f(0)=0 and f(I)=$F_e/2$. The subdivision into frequency bands can be uniform (f(i)−f(I−1)=$F_e/2I$). It can also be non-uniform (for example according to a barks scale). A module 12 computes the respective averages of the spectral components $S_{n,f}$ of the speech signal in bands, for example by means of a uniform weighting such as:

$$S_{n,i} = \frac{1}{f(i) - f(i-1)} \sum_{f \in [f(i-1), f(i)[} S_{n,f} \quad (1)$$

This averaging reduces fluctuations between bands by averaging the contributions of the noise in the bands, which reduces the variance of the noise estimator. Also, this averaging greatly reduces the complexity of the system.

The averaged spectral components $S_{n,i}$ are sent to a vocal activity detector module 15 and a noise estimator module 16. The two modules 15, 16 operate conjointly in the sense that degrees of vocal activity $\gamma_{n,i}$ measured for the various bands by the module 15 are used by the module 16 to estimate the long-term energy of the noise in the various bands, whereas the long-term estimates $\hat{B}_{n,i}$ are used by the module 15 for a priori suppression of noise in the speech signal in the various bands to determine the degrees of vocal activity $\gamma_{n,i}$.

Figure 3:
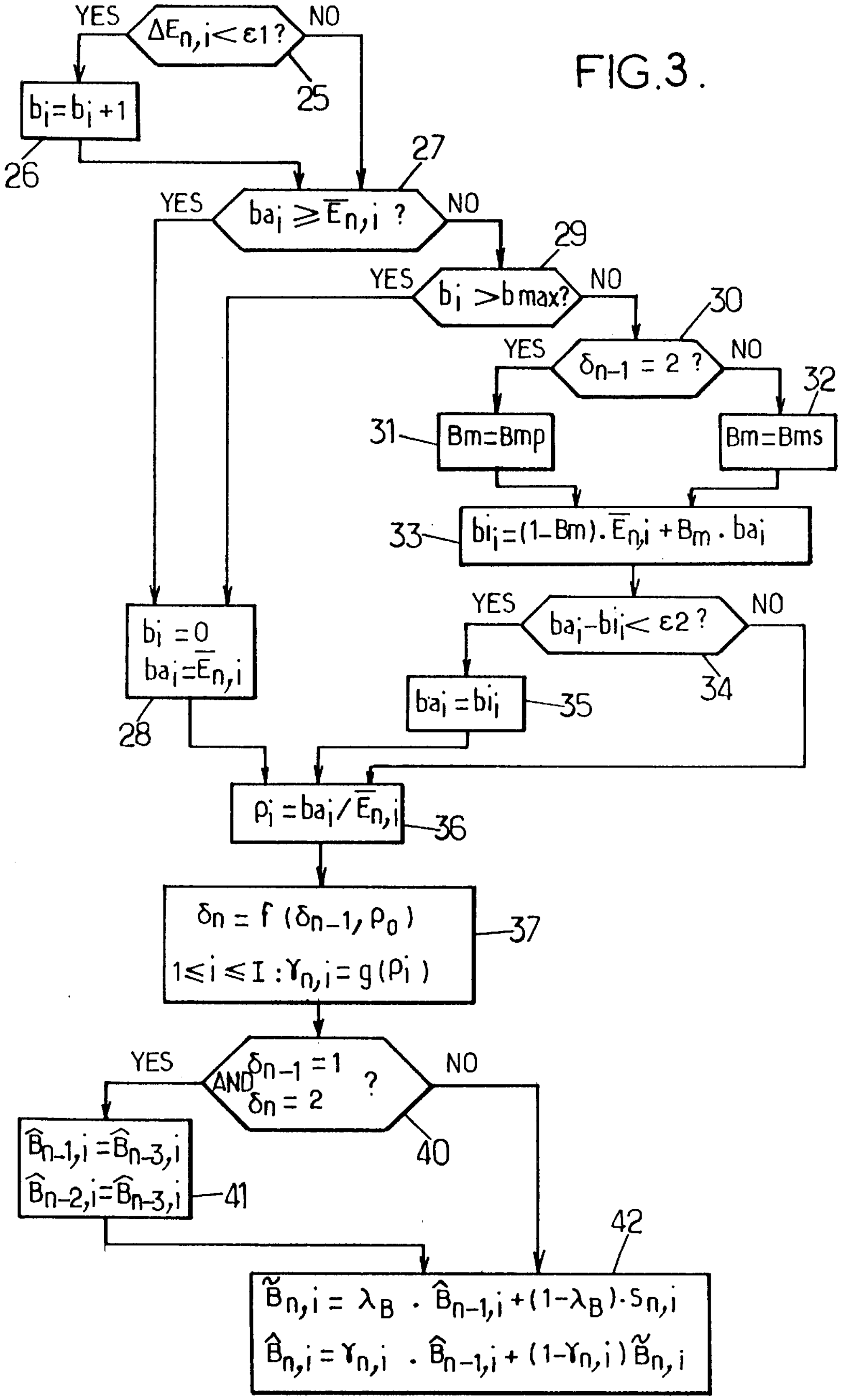

The operation of the modules 15 and 16 can correspond to the flowcharts shown in FIGS. 2 and 3.

In steps 17 through 20, the module 15 effects a priori suppression of noise in the speech signal in the various bands i for the signal frame n. This a priori noise suppression is effected by a conventional non-linear spectral subtraction scheme based on estimates of the noise obtained in one or more preceding frames. In step 17, using the resolution of the bands I, the module 15 computes the frequency response $Hp_{n,i}$ of the a priori noise suppression filter from the equation:

$$Hp_{n,1} = \frac{S_{n,i} - \alpha'_{n-\tau1,i} \cdot \hat{B}_{n-\tau1,i}}{S_{n-\tau2,i}} \quad (2)$$

where τ1 and τ2 are delays expressed as a number of frames (τ1≧1, τ2≧0), and $\alpha_{n,i}'$ is a noise overestimation coefficient determined as explained later. The delay τ1 can be fixed (for example τ1=1) or variable. The greater the degree of confidence in the detection of vocal activity, the lower the value of τ1.

In steps 18 to 20, the spectral components $\hat{E}p_{n,i}$ are computed from:

$$\hat{E}p_{n,i} = \max\{Hp_{n,i} \cdot S_{n,i},\ \beta p_i \cdot \hat{B}_{n-\tau1,i}\} \quad (3)$$

where $\beta p_i$ is a floor coefficient close to 0, used conventionally to prevent the spectrum of the noise-suppressed signal from taking negative values or excessively low values which would give rise to musical noise.

Steps 17 to 20 therefore essentially consist of subtracting from the spectrum of the signal an estimate of the a priori estimated noise spectrum, over-weighted by the coefficient $\alpha'_{n-\tau1,i}$.

In step 21, the module 15 computes the energy of the a priori noise-suppressed signal in the various bands i for frame n: $E_{n,i} = \hat{E}p_{n,i}^2$. It also computes a global average $E_{n,0}$ of the energy of the a priori noise-suppressed signal by summing the energies for each band $E_{n,i}$ weighted by the widths of the bands. In the following notation, the index i=0 is used to designate the global band of the signal.

In steps 22 and 23, the module 15 computes, for each band i ($0 \leqq i \leqq I$), a magnitude $\Delta E_{n,i}$ representing the short-term variation in the energy of the noise-suppressed signal in the band i and a long-term value $\overline{E}_{n,i}$ of the energy of the noise-suppressed signal in the band i. The magnitude $\Delta E_{n,i}$ can be computed from a simplified equation:

$$\Delta E_{n,i} = \left| \frac{E_{n-4,i} + E_{n-3,i} - E_{n-1,i} - E_{n,i}}{10} \right|.$$

As for the long-term energy $\overline{E}_{n,i}$, it can be computed using a forgetting factor B1 such that 0<B1<1, namely $\overline{E}_{n,i}=B1\cdot\overline{E}_{n-1,i}+(1-B1)\cdot E_{n,i}$.

After computing the energies $E_{n,i}$ of the noise-suppressed signal, its short-term variations $\Delta E_{n,i}$ and its long-term values $\overline{E}_{n,i}$ in the manner indicated in FIG. 2, the module 15 computes, for each band i ($0 \leqq i \leqq I$), a value $\rho_i$ representative of the evolution of the energy of the noise-suppressed signal. This computation is effected in steps 25 to 36 in FIG. 3, executed for each band i from i=0 to i=I. The computation uses a long-term noise envelope estimator $ba_i$, an internal estimator $bi_i$ and a noisy frame counter $b_i$.

In step 25, the magnitude $\Delta E_{n,i}$ is compared to a threshold $\epsilon$1. If the threshold $\epsilon$1 has not been reached, the counter $b_i$ is incremented by one unit in step 26. In step 27, the long-term estimator $b_{ai}$ is compared to the smoothed energy value $\overline{E}_{n,i}$. If $ba_i \geqq \overline{E}_{n,i}$, the estimator $ba_i$ is taken as equal to the smoothed value $\overline{E}_{n,i}$ in step 28 and the counter $b_i$ is reset to zero. The magnitude $\rho_i$, which is taken as equal to $ba_i/\overline{E}_{n,i}$ (step 36 ), is then equal to 1.

If step 27 shows that $ba_i<\overline{E}_{n,i}$, the counter $b_i$ is compared to a limit value bmax in step 29. If $b_i$>bmax, the signal is considered to be too stationary to support vocal activity. The aforementioned step 28, which amounts to considering that the frame contains only noise, is then executed. If $b_i \leqq$ bmax in step 29, the internal estimator $bi_i$ is computed in step 33 from the equation:

$$bi_i=(1-Bm)\cdot\overline{E}_{n,i}+Bm\cdot ba_i \qquad (4)$$

In the above equation, Bm represents an update coefficient from 0.90 to 1. Its value differs according to the state of a vocal activity detector automaton (steps 30 to 32). The state $\delta_{n-1}$ is that determined during processing of the preceding frame. If the automaton is in a speech detection state ($\delta_{n-1}$=2 in step 30), the coefficient Bm takes a value Bmp very close to 1 so the noise estimator is very slightly updated in the presence of speech. Otherwise, the coefficient Bm takes a lower value Bms to enable more meaningful updating of the noise estimator in the silence phase. In step 34, the difference $ba_i-bi_i$ between the long-term estimator and the internal noise estimator is compared with a threshold $\epsilon$2. If the threshold $\epsilon$2 has not been reached, the long-term estimator $ba_i$ is updated with the value of the internal estimator $bi_i$ in step 35. Otherwise, the long-term estimator $ba_i$ remains unchanged. This prevents sudden variations due to a speech signal causing the noise estimator to be updated.

After the magnitudes $\rho_i$ have been obtained, the module 15 proceeds to the vocal activity decisions of step 37. The module 15 first updates the state of the detection automaton according to the magnitude $\rho_0$ calculated for all of the band of the signal. The new state $\delta^n$ of the automaton depends on the preceding state $\delta_{n-1}$ and on $\rho_0$, as shown in FIG. 4.

Four states are possible: δ=0 detects silence, or absence of speech, δ=2 detects the presence of vocal activity and states δ=1 and δ=3 are intermediate rising and falling states. If the automaton is in the silence state ($\delta_{n-1}$=0) it remains there if $\rho_0$ does not exceed a first threshold SE1, and otherwise goes to the rising state. In the rising state ($\delta_{n-1}$=1), it reverts to the silence state if $\rho_0$ is smaller than the threshold SE1, goes to the speech state if $\rho_0$ is greater than a second threshold SE2 greater than the threshold SE1 and it remains in the rising state if SE1$\leqq\rho_0\leqq$SE2. If the automaton is in the speech state ($\delta_{n-1}$=2) it remains there if $\rho_0$ exceeds a third threshold SE3 lower than the threshold SE2, and enters the falling state otherwise. In the falling state ($\delta_{n-1}$=3), the automaton reverts to the speech state if $\rho_0$ is higher than the threshold SE2, reverts the silence state if $\rho_0$ is below a fourth threshold SE4 lower than the threshold SE2 and remains in the falling state if SE4$\leqq\rho_0\leqq$SE2.

Figure 5:
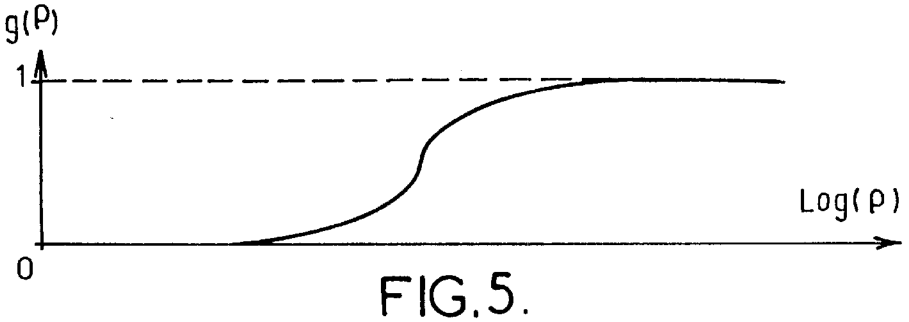
FIG. 5 is a graph showing variations in a degree of vocal activity.

In step 37, the module 15 also computes the degrees of vocal activity $\gamma_{n,i}$ in each band $i \geqq 1$. This degree $\gamma_{n,i}$ is preferably a non-binary parameter, i.e. the function $\gamma_{n,i}=g(\rho_i)$ is a function varying continuously in the range from 0 to 1 as a function of the values taken by the magnitude $\rho_i$. This function has the shape shown in FIG. 5, for example.

The module 16 calculates the estimates of the noise on a band by band basis, and the estimates are used in the noise suppression process, employing successive values of the components $S_{n,i}$ and the degrees of vocal activit $\gamma_{n,i}$. This corresponds to steps 40 to 42 in FIG. 3. Step 40 determines if the vocal activity detector automaton has just gone from the rising state to the speech state. If so, the last two estimates $\hat{B}_{n-1,i}$ and $\hat{B}_{n-2,i}$ previously computed for each band $i \geqq 1$ are corrected according to the value of the preceding estimate $\hat{B}_{n-3,i}$. The correction is done to allow for the fact that, in the rise phase (δ=1), the long-term estimates of the energy of the noise in the vocal activity detection process (steps 30 to 33 ) were computed as if the signal included only noise (Bm=Bms), with the result that they may be subject to error.

In step 42, the module 16 updates the estimates of the noise on a band by band basis using the equations:

$$\tilde{B}_{n,i}=\lambda_B\cdot\hat{B}_{n-1,i}+(1-\lambda_B)\cdot S_{n,i} \qquad (5)$$

$$\hat{B}_{n,i}=\gamma_{n,i}\cdot\hat{B}_{n-1,i}+(1-\gamma_{n,i})\cdot\tilde{B}_{n,i} \qquad (6)$$

in which $\lambda_B$ designates a forgetting factor such that $0<\lambda_B<1$. Equation (6) shows that the non-binary degree of vocal activity $\gamma_{n,i}$ is taken into account.

As previously indicated, the long-term estimates of the noise $\hat{B}_{n,i}$ are overestimated by a module 45 (FIG. 1) before noise suppression by non-linear spectral subtraction. The module 45 computes the overestimation coefficient $\alpha_{n,i}'$ previously referred to, along with an overestimate $\hat{B}_{n,i}'$ which essentially corresponds to $\alpha_{n,i}'\cdot\hat{B}_{n,i}$.

Figure 6:
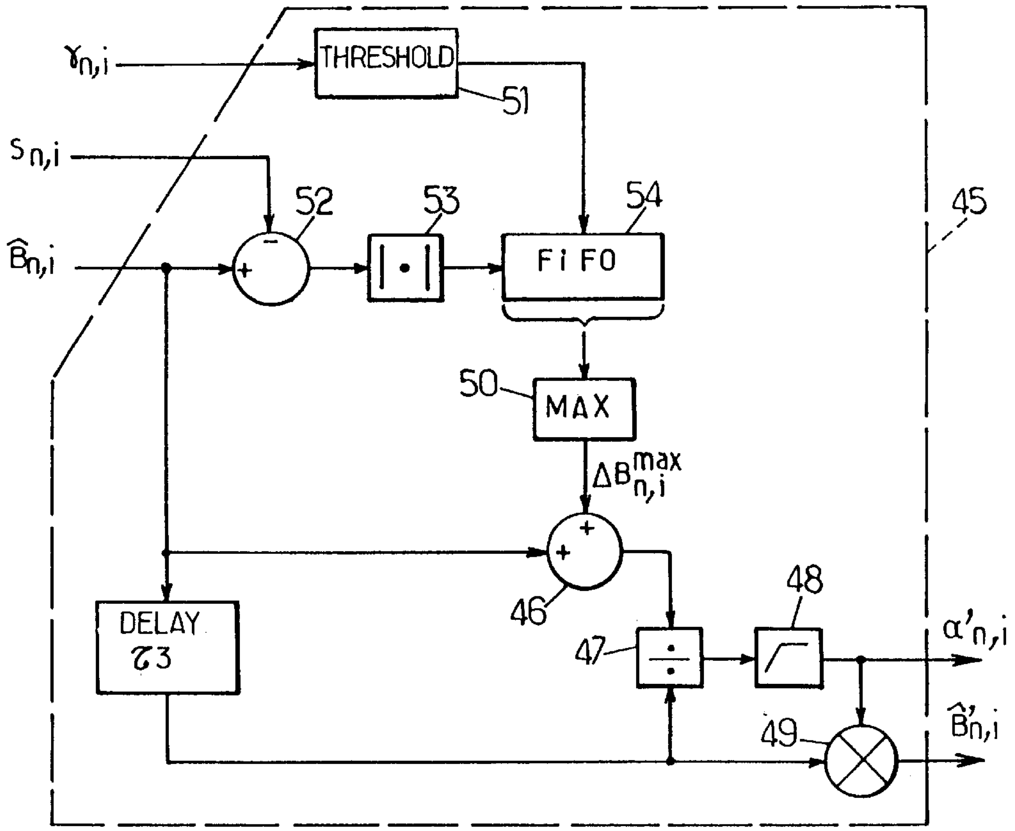
FIG. 6 is a block diagram of a module for overestimating the noise of the system shown in FIG. 1.

FIG. 6 shows the organisation of the overestimation module 45. The overestimate $\hat{B}_{n,i}'$ is obtained by combining the long-term estimate $\hat{B}_{n,i}$ and a measurement $\Delta B_{n,i}^{max}$ of the variability of the component of the noise in the band i around its long-term estimate. In the example considered, the combination is essentially a simple sum performed by an adder 46. It could instead be a weighted sum.

The overestimation coefficient $\alpha_{n,i}'$ is equal to the ratio between the sum $\hat{B}_{n,i}+\Delta B_{n,i}^{max}$ delivered by the adder 46 and the delayed long-term estimate $\hat{B}_{n-\tau3,i}$ (divider 47 ), with a ceiling limit value $\alpha_{max}$, for example $\alpha_{dmax}$=4 (block 48 ). The delay τ3 is used to correct the value of the overestimation coefficient $\alpha_{n,i}^{40}$ if necessary, in the rising phases (δ=1), before the long-term estimates have been corrected by steps 40 and 41 from FIG. 3 (for example τ3=3).

The overestimate $\hat{B}_{n,i}'$ is finally taken as equal to $\alpha_{n,i}'\cdot\hat{B}_{n-\tau3,i}$ (multiplier 49 ).

The measurement $\Delta B_{n,i}^{max}$ of the variability of the noise reflects the variance of the noise estimator. It is obtained as a function of the values of $S_{n,i}$ and of $\hat{B}_{n,i}$ computed for a certain number of preceding frames over which the speech signal does not feature any vocal activity in band i. It is a function of the differences $|S_{n-k,i}-\hat{B}n-k,i|$ computed for a number K of silence frames ($n-k \leqq n$). In the example shown, this function is simply the maximum (block 50). For each frame n, the degree of vocal activity $\gamma_{n,i}$ is compared to a threshold (block 51) to decide if the difference $|S_{n,i}-\hat{B}_{n,i}|$, calculated at 52–53, must be loaded into a queue 54 with K locations organised in first-in/first-out (FIFO) mode, or not. If $\gamma_{n,i}$ does not exceed the threshold (which can be equal to 0 if the function g( ) has the form shown in FIG. 5), the FIFO 54 is not loaded; otherwise it is loaded. The maximum value contained in the FIFO 54 is then supplied as the measured variability $\Delta B_{n,i}^{max}$.

The measured variability $\Delta B_{n,i}^{max}$ can instead be obtained as a function of the values $S_{n,f}$ (not $S_{n,i}$) and $\hat{B}_{n,i}$. The procedure is then the same, except that the FIFO 54 contains, instead of $|S_{n-k,i}-\hat{B}_{n-k,i}|$ for each of the bands i, $$\max_{f \in [f(i-1), f(i)[} |S_{n-k,f} - \hat{B}_{n-k,i}|.$$

Because of the independent estimates of the long-term fluctuations $\hat{B}_{n,i}$ and short-term variability $\Delta B_{n,i}^{max}$ of the noise, the overestimator $\hat{B}_{n,i}'$ makes the noise suppression process highly robust to musical noise.

The module 55 shown in FIG. 1 performs a first spectral subtraction phase. This phase supplies, with the resolution of the bands i ($1 \leqq i \leqq I$), the frequency response $H_{n,i}^{1}$ of a first noise suppression filter, as a function of the components $S_{n,i}$ and $\hat{B}_{n,i}$ and the overestimation coefficients $\alpha_{n,i}'$. This computation can be performed for each band i using the equation:

$$H_{n,i}^{1} = \frac{\max\{S_{n,i} - \alpha'_{n,i} \cdot \hat{B}_{n,i},\ \beta_i^1 \cdot \hat{B}_{n,i}\}}{S_{n-\tau 4,i}} \qquad (7)$$

in which $\tau 4$ is an integer delay such that $\tau 4 \geqq 0$ (for example $\tau 4=0$). The coefficient $\beta_i^1$ in equation (7), like the coefficient $\beta p_i$ in equation (3), represents a floor used conventionally to avoid negative values or excessively low values of the noise-suppressed signal.

In a manner known in the art (see EP-A-0 534 837), the overestimation coefficient $\alpha_{n,i}'$ in equation (7) could be replaced by another coefficient equal to a function of $\alpha_{n,i}'$ and an estimate of the signal-to-noise ratio (for example $S_{n,i}/\hat{B}_{n,i}$), this function being a decreasing function of the estimated value of the signal-to-noise ratio. This function is then equal to $\alpha_{n,i}'$ for the lowest values of the signal-to-noise ratio. If the signal is very noisy, there is clearly no utility in reducing the overestimation factor. This function advantageously decreases toward zero for the highest values of the signal/noise ratio. This protects the highest energy areas of the spectrum, in which the speech signal is the most meaningful, the quantity subtracted from the signal then tending toward zero.

This strategy can be refined by applying it selectively to the harmonics of the pitch frequency of the speech signal if the latter features vocal activity.

Accordingly, in the embodiment shown in FIG. 1, a second noise suppression phase is performed by a harmonic protection module 56. This module computes, with the resolution of the Fourier transform, the frequency response $H_{n,f}^{2}$ of a second noise suppression filter as a function of the parameters $H_{n,i}^{1}$, $\alpha_{n,i}'$, $\hat{B}_{n,i}$, $\delta_n$, $S_{n,i}$ and the pitch frequency $f_p=F_e/T_p$ computed outside silence phases by a harmonic analysis module 57. In a silence phase ($\delta_n=0$), the module 56 is not in service, i.e. $H_{n,f}^{2}=H_{n,i}^{1}$ for each frequency f of a band i. The module 57 can use any prior art method to analyse the speech signal of the frame to determine the pitch period $T_p$, expressed as an integer or fractional number of samples, for example a linear prediction method.

The protection afforded by the module 56 can consist in effecting, for each frequency f belonging to a band i:

$$\begin{cases} H_{n,f}^2 = 1 \quad \text{if} & \begin{cases} S_{n,i} - \alpha'_{n,i} \cdot \hat{B}_{n,i} > \beta_i^2 \cdot \hat{B}_{n,i} & (8) \\ \text{and } \exists\, \eta \text{ integer}/|f - n \cdot f_p| \leq \Delta f/2 & (9) \end{cases} \\ H_{n,f}^2 = H_{n,f}^1 & \text{otherwise} \end{cases}$$

$\Delta f=F_e/N$ represents the spectral resolution of the Fourier transform. If $H_{n,f}^{2}=1$, the quantity subtracted from the component $S_{n,f}$, is zero. In this computation, the floor coefficients $\beta_i^2$ (for example $\beta_i^2=\beta_i^1$) express the fact that some harmonics of the pitch frequency $f_p$ can be masked by noise, so that there is no utility in protecting them.

This protection strategy is preferably applied for each of the frequencies closest to the harmonics of $f_p$, i.e. for any integer $\eta$.

If $\delta f_p$ denotes the frequency resolution with which the analysis module 57 produces the estimated pitch frequency $f_p$, i.e. if the real pitch frequency is between $f_p-\delta f_p/2$ and $f_p+\delta f_p/2$, then the difference between the $\eta$-th harmonic of the real pitch frequency and its estimate $\eta \times f_p$ (condition (9)) can go up to $\pm\eta\times\delta f_p/2$. For high values of $\eta$, the difference can be greater, than the spectral half-resolution $\Delta f/2$ of the Fourier transform. To take account of this uncertainty, and to guarantee good protection of the harmonics of the real pitch, each of the frequencies in the range $[\eta\times f_p-\eta\times\delta f_p/2,\ \eta\times f_p+\eta\times\delta f_p/2]$ can be protected, i.e. condition (9) above can be replaced with:

$$\exists \eta \text{ integer}/|f-\eta \cdot f_p| \leqq (\eta \cdot \delta f_p + \Delta f)/2 \qquad (9')$$

This approach (condition (9')) is of particular benefit if the values of $\eta$ can be high, especially if the process is used in a broadband system.

For each protected frequency, the corrected frequency response $H_{n,f}^{2}$ can be equal to 1, as indicated above, which in the context of spectral subtraction corresponds to the subtraction of a zero quantity, i.e. to complete protection of the frequency in question. More generally, this corrected frequency response $H_{n,f}^{2}$ could be taken as equal to a value from 1 to $H_{n,f}^{1}$, according to the required degree of protection, which corresponds to subtracting a quantity less than that which would be subtracted if the frequency in question were not protected.

The spectral components $S_{n,f}^{2}$ of a noise-suppressed signal are computed by a multiplier 58:

$$S_{n,f}^2 = H_{n,f}^2 \cdot S_{n,f} \qquad (10)$$

This signal $S_{n,f}^{2}$ is supplied to a module 60 which computes a masking curve for each frame n by applying a psychoacoustic model of how the human ear perceives sound.

The masking phenomenon is a well-known principle of the operation of the human ear. If two frequencies are present simultaneously, it is possible for one of them not to be audible. It is then said to be masked.

Figure 7:
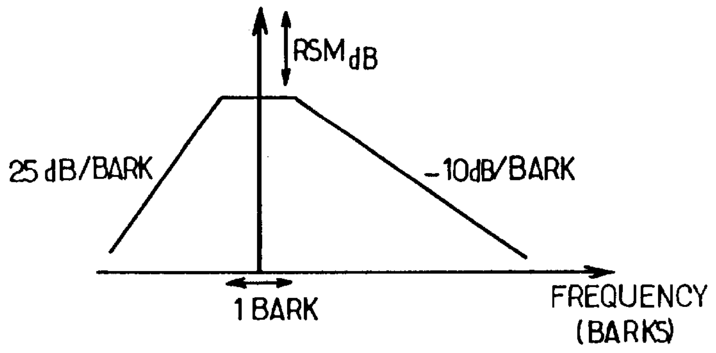
FIG. 7 is a graph illustrating the computation of a masking curve.

There are various methods of computing masking curves. The method developed by J. D. Johnston can be used, for example ("Transform Coding of Audio Signals Using Perceptual Noise Criteria", IEEE Journal on Selected Areas in Communications, Vol. 6, No. 2, February 1988). That method operates in the barks frequency scale. The masking curve is seen as the convolution of the spectrum spreading function of the basilar membrane in the bark domain with the exciter signal, which in the present application is the signal $S_{n,f}^2$. The spectrum spreading function can be modelled in the manner shown in FIG. 7. For each bark band, the contribution of the lower and higher bands convoluted with the spreading function of the basilar membrane is computed from the equation:

$$C_{n,q}=\sum_{q'=0}^{q-1}\frac{S_{n,q'}^2}{(10^{10/10})^{(q-q')}}+\sum_{q'=q+1}^{Q}\frac{S_{n,q'}^2}{(10^{25/10})^{(q'-q)}} \quad (11)$$

in which the indices q and q' designate the bark bands ($0\leqq q,q'\leqq Q$) and $S_{n,q}^2$ represents the average of the components $S_{n,f}^2$ of the noise-suppressed exciter signal for the discrete frequencies f belonging to the bark band q'.

The module 60 obtains the masking threshold $M_{n,q}$ for each bark band q from the equation:

$$M_{n,q}=C_{n,q}/R_q \quad (12)$$

in which $R_q$ depends on whether the signal is relatively more or relatively less voiced. As is well-known in the art, one possible form of $R_q$ is:

$$10.\log_{10}(R_q)=(A+q)\cdot\chi+B\cdot(1-\chi) \quad (13)$$

with A=14.5 and B=5.5. $\chi$ designated a degree of voicing of the speech signal, varying from 0 (no voicing) to 1 (highly voiced signal). The parameter $\chi$ can be of the form known in the art:

$$\chi=\min\left\{\frac{SFM}{SFM_{\max}},1\right\} \quad (12)$$

where SFM represents the ratio in decibels between the arithmetic mean and the geometric mean of the energy of the bark bands and $SFM_{max}=-60$ dB.

The noise suppression system further includes a module 62 which corrects the frequency response of the noise suppression filter as a function of the masking curve $M_{n,q}$ computed by the module 60 and the overestimates $\hat{B}_{n,i}$ computed by the module 45. The module 62 decides which noise suppression level must really be achieved.

By comparing the envelope of the noise overestimate with the envelope formed by the masking thresholds $M_{n,q}$, a decision is taken to suppress noise in the signal only to the extent that the overestimate $\hat{B}_{n,i}'$ is above the masking curve. This avoids unnecessary suppression of noise masked by speech.

The new response $H_{n,f}^3$, for a frequency f belonging to the band i defined by the module 12 and the bark band q, thus depends on the relative difference between the overestimate $\overline{B}_{n,i}'$ of the corresponding spectral component of the noise and the masking curve $M_{n,q}$, in the following manner:

$$H_{n,f}^3=1-(1-H_{n,f}^2)\cdot\max\left\{\frac{\hat{B}_{n,i}'-M_{n,q}}{\hat{B}_{n,i}'},\ 0\right\} \quad (14)$$

In other words, the quantity subtracted from a spectral component $S_{n,f}$, in the spectral subtraction process having the frequency response $H_{n,f}^3$, is substantially equal to whichever is the lower of the quantity subtracted from this spectral component in the spectral subtraction process having the frequency response $H_{n,f}^2$ and the fraction of the overestimate $\hat{B}_{n,i}'$ of the corresponding spectral component of the noise which possibly exceeds the masking curve $M_{n,q}$.

Figure 8:
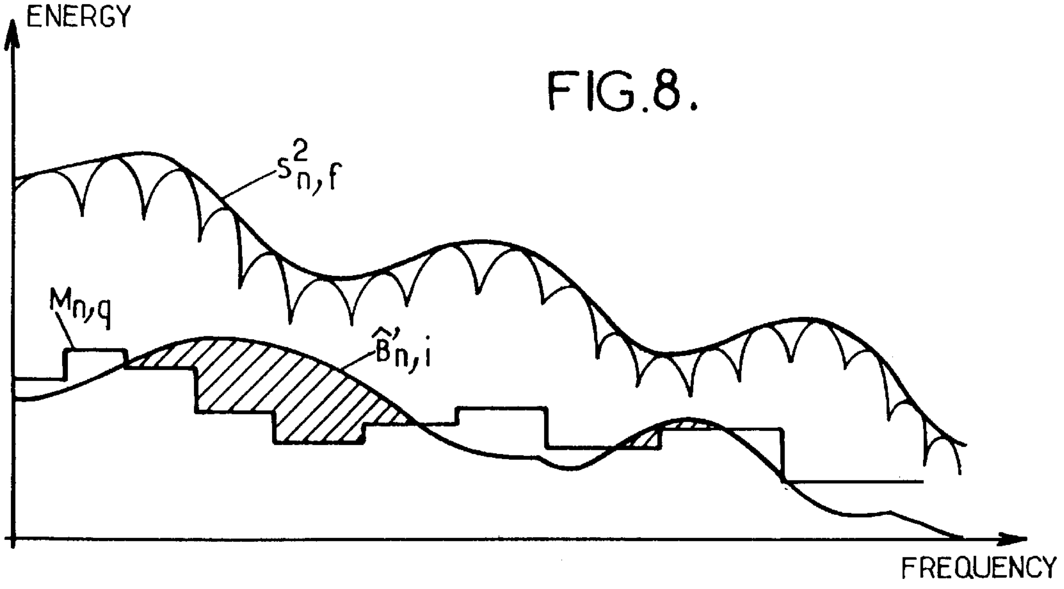
FIG. 8 is a graph illustrating the use of masking curves in the system shown in FIG. 1.

FIG. 8 illustrates the principle of the correction applied by the module 62. It shows in schematic form an example of a masking curve $M_{n,q}$ computed on the basis of the spectral components $S_{n,f}^2$ of the noise-suppressed signal as well as the overestimate $\hat{B}_{n,i}'$ of the noise spectrum. The quantity finally subtracted from the components $S_{n,f}$ is that shown by the shaded areas, i.e. it is limited to the fraction of the overestimate $\hat{B}_{n,i}'$ of the spectral components of the noise which is above the masking curve.

The subtraction is effected by multiplying the frequency response $H_{n,f}^3$ of of the noise suppression filter by the spectral components $S_{n,f}$ of the speech signal (multiplier 64). The module 65 then reconstructs the noise-suppressed signal in the time domain by applying the inverse fast Fourier transform (IFFT) to the samples of frequency $S_{n,f}^3$ delivered by the multiplier 64. For each frame, only the first N/2=128 samples of the signal produced by the module 65 are delivered as the final noise-suppressed signal $s^3$, after overlap-add reconstruction with the N/2=128 last samples of the preceding frame (module 66).

Figure 9:
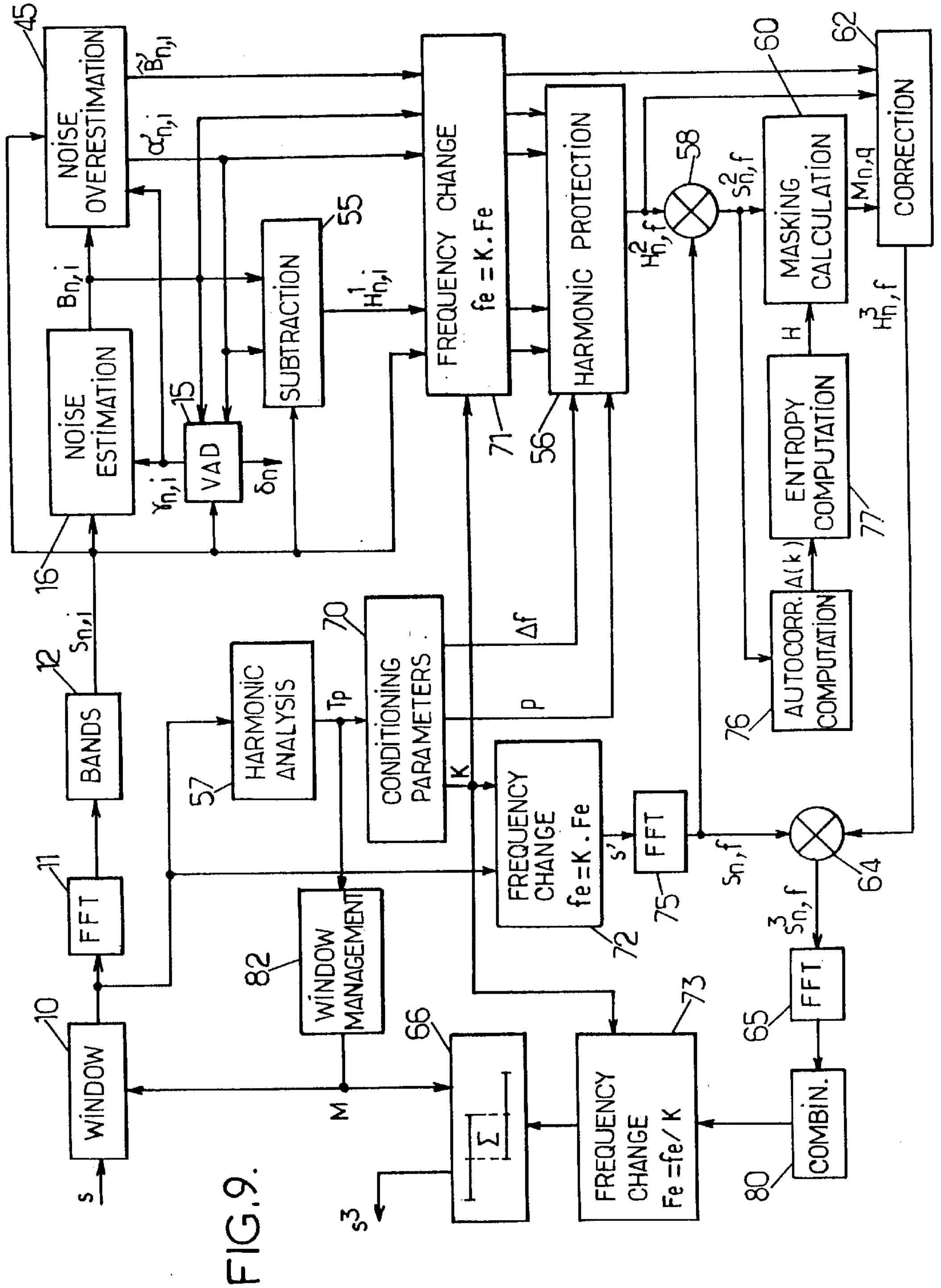
FIG. 9 is a block diagram of another noise suppression system implementing the present invention.

FIG. 9 shows a preferred embodiment of a noise suppression system using the invention. The system includes a number of components similar to corresponding components of the system shown in FIG. 1, for which the same reference numbers are used. Accordingly, the modules 10, 11, 12, 15, 16, 45 and 55 supply in particular the quantities $S_{n,i}$, $\hat{B}_{n,i}$, $\alpha_{n,i}'$, $\hat{B}_{n,i}'$ and $H_{n,f}^1$ used for selective noise suppression.

The frequency resolution of the fast Fourier transform 11 constitutes a limitation of the system shown in FIG. 1. The frequency protected by the module 56 is not necessarily the precise pitch frequency $f_p$, but the frequency closest to it in the discrete spectrum. In some cases, harmonics relatively far away from the pitch harmonics may be protected. The system shown in FIG. 9 alleviates this drawback by appropriately conditioning the speech signal.

This conditioning modifies the sampling frequency of the signal so that the period $1/f_p$ exactly covers an integer number of sample times of the conditioned signal.

Many methods of harmonic analysis which can be used by the module 57 are capable of supplying a fractional value of the delay $T_p$, expressed as a number of samples at the initial sampling frequency $F_e$. A new sampling frequency $f_e$ is then chosen which is equal to an integer multiple of the estimated pitch frequency, i.e. $f_e=p\cdot f_p=p\cdot F_e/T_p=K\cdot F_e$, where p is an integer. To avoid losing signal samples, $f_e$ must be higher than $F_e$. In particular, to facilitate conditioning it is possible to impose the condition that $f_e$ must lie in the range from $F_e$ to $2F_e$ ($1\leqq K\leqq 2$).

Of course, it is not necessary to condition the signal if no vocal activity is detected in the current frame ($\delta_n\neq 0$) or if the delay $T_p$ estimated by the module 57 is an integer delay.

For each pitch harmonic to correspond to an integer number of samples of the conditioned signal, the integer p must be a factor of the size N of the signal window produced by the module 10: N=αp, where α is an integer. This size N is usually a power of 2 for the implementation of the FFT. It is 256 in the example considered here.

The spectral resolution Δf of the discrete Fourier transform of the conditioned signal is given by the equation $\Delta f=p\cdot f_p/N=f_p/\alpha$. It is therefore beneficial to make p small, to maximise α, but large enough to perform oversampling. In the example considered here, where $F_e$=8 kHz and N=256, the values chosen for the parameters p and α are indicated in table I.

TABLE I

| | | | |
|---|---|---|---|
| 500 Hz < $f_p$ < 1 000 Hz | 8 < $T_p$ < 16 | p = 16 | α = 16 |
| 250 Hz < $f_p$ < 500 Hz | 16 < $T_p$ < 32 | p = 32 | α = 8 |
| 125 Hz < $f_p$ < 250 Hz | 32 < $T_p$ < 64 | p = 64 | α = 4 |
| 62.5 Hz < $f_p$ < 125 Hz | 64 < $T_p$ < 128 | p = 128 | α = 2 |
| 31,25 Hz < $f_p$ < 62,5 Hz | 128 < $T_p$ < 256 | p = 256 | α = 1 |

The choice is made by a module 70 according to the value of the delay $T_p$ supplied by the harmonic analysis module 57. The module 70 supplies the ratio K between the sampling frequencies to three frequency changer modules 71, 72, 73.

The module 71 transforms the values $S_{n,i}$, $\hat{B}_{n,i}$, $\alpha_{n,i}'$, $\hat{B}^{n,i'}$ and $H_{n,f}^{1}$ relating to the bands i defined by the module 12 into the modified frequency scale (sampling frequency $f_e$). This transformation merely expands the bands i by the factor K. The transformed values are supplied to the harmonic protection module 56.

The latter module then operates as before to supply the frequency response $H_{n,f}^2$ of the noise suppression filter. This response $H_{n,f}^2$ is obtained in the same manner as in FIG. 1 (conditions (8) and (9)), except that, in condition (9), the pitch frequency $f_p=f_e/p$ is defined according to the value of the integer delay p supplied by the module 70, the module 70 also supplying the frequency resolution Δf.

The module 72 oversamples the frame of N samples supplied by the windowing module 10. Oversampling by a rational factor K (K=K1/K2) consists in first oversampling by the integer factor K1 and then undersampling by the integer factor K2. This oversampling and undersampling by integer factors can be effected in the conventional way by means of banks of polyphase filters.

The conditioned signal frame s' supplied by the module 72 includes KN samples at the frequency $f_e$. The samples are sent to a module 75 which computes their Fourier transform. The transformation can be effected on the basis of two blocks of N=256 samples: one constituted by the first N samples of the frame of length KN of the conditioned signal s' and the other of the last N samples of that frame. The two blocks therefore have an overlap of (2−K)×100%. For each of the two blocks, a set of Fourier components $S_{n,f}$ is obtained. The components $S_{n,f}$ are supplied to the multiplier 58, which multiplies them by the spectral response $H_{n,f}^2$ to deliver the spectral components $S_{n,f}^2$ of the first noise-suppressed signal.

The components $S_{n,f}^2$ are sent to the module 60 which computes the masking curves in the manner previously indicated.

When computing the masking curves, the magnitude χ designating the degree of voicing of the speech signal (equation (13)) is preferably taken in the form χ=1−H, where H is an entropy of the autocorrelation of the spectral components $S_{n,f}^2$ of the noise-suppressed conditioned signal. The autocorrelations A(k) are computed by a module 76, for example using the equation:

$$A(k)=\frac{\sum_{f=0}^{N/2-1} s_{n,f}^2\cdot s_{n,f+k}^2}{\sum_{f=0}^{N/2-1}\sum_{f'=0}^{N/2-1} s_{n,f}^2\cdot s_{n,f+f'}^2} \tag{15}$$

A module 77 then computes the normalised entropy H and supplies it to the module 60 for computing the masking curve (see S. A. McClellan et al. : "Spectral Entropy: an Alternative Indicator for Rate Allocation?", Proc. ICASSP'94, pages 201–204):

$$H=\frac{\sum_{k=0}^{N/2-1} A(k)\cdot\log[A(k)]}{\log(N/2)} \tag{16}$$

Because of the conditioning of the signal, and its noise suppression by the filter $H_{n,f}^2$ the normalised entropy H constitutes a measurement of voicing that is very robust to noise and to pitch variations.

The correction module 62 operates in the same manner as that of the system shown in FIG. 1, allowing for the overestimated noise $\hat{B}_{n,i}$ rescaled by the frequency changer module 71. It supplies the frequency response $H_{n,f}^3$ of the final noise suppression filter, which is multiplied by the spectral components $S_{n,f}$ of the conditioned signal by the multiplier 64. The resulting components $S_{n,f}^3$ are processed back to the time domain by the IFFT module 65. A module 80 at the output of the IFFT module 65 combines, for each frame, the two signal blocks resulting from the processing of the two overlapping blocks supplied by the FFT 75. This combination can consist of a Hamming weighted sum of the samples to form a noise-suppressed conditioned signal frame of KN samples.

The module 73 changes the sampling frequency of the noise-suppressed conditioned signal supplied by the module 80. The sampling frequency is returned to $F_e=f_e/K$ by operations which are the inverse of those effected by the module 75. The module 73 delivers N=256 samples per frame. After overlap-add reconstruction using the last N/2=128 samples of the preceding frame, only the first N/2=128 samples of the current frame are finally retained to form the final noise-suppressed signal $s^3$ (module 66).

In a preferred embodiment, a module 82 manages the windows formed by the module 10 and saved by the module 66, to retain a number M of samples equal to an integer multiple of $T_p=F_e/f_p$. This avoids problems of phase discontinuity between frames. In a corresponding manner, the management module 82 controls the windowing module 10 so that the overlap between the current frame and the next corresponds to N-M. This overlap of N-M samples is taken into account in the overlap-add operation effected by the module 66 when processing the next frame. From the value of $T_p$ supplied by the harmonic analysis module 57, the module 82 computes the number of samples to be retained $M=T_p\times E[N/(2T_p)]$, E[0 ] designating the integer part, and controls the modules 10 and 66 accordingly.

In the embodiment just described, the pitch frequency is estimated as an average over the frame. The pitch can vary slightly over this duration. It is possible to allow for these variations in the context of the present invention by conditioning the signal to obtain a constant pitch in the frame by artificial means.

This requires the harmonic analysis module 57 to supply the time intervals between consecutive breaks of the speech signal which can be attributed to glottal closures of the speaker occurring during the duration of the frame. Methods which can be used to detect such micro-breaks are well-known in the art of harmonic analysis of speech signals. In this connection, reference may be had to the following articles: M. BASSEVILLE et al., "Sequential detection of abrupt changes in spectral characteristics of digital signals", IEEE Trans. on Information Theory, 1983, Vol. IT-29, No.5, pages 708–723; R. ANDRE-OBRECHT, "A new statistical approach for the automatic segmentation of continuous speech signals", IEEE Trans. on Acous., Speech and Sig. Proc., Vol. 36, No. 1 January 1988; and C. MURGIA et al., "An algorithm for the estimation of glottal closure instants using the sequential detection of abrupt changes in speech signals", Signal Processing VII, 1994, pages 1685–1688.

The principle of the above methods is to effect a statistical test between a short-term model and a long-term model. Both models are adaptive linear prediction models. The value of the statistical test $w_m$ is the cumulative sum of the a posteriori likelihood ratio of two distributions, corrected by the Kullback divergence. For a distribution of residues having a Gaussian statistic, the value $w_m$ is given by:

$$w_m = \frac{1}{2}\left[\frac{2\cdot e_m^0\cdot e_m^1}{\sigma_1^2} - \left(1+\frac{\sigma_0^2}{\sigma_1^2}\right)\cdot\frac{(e_m^0)^2}{\sigma_0^2} + \left(1-\frac{\sigma_0^2}{\sigma_1^2}\right)\right] \tag{17}$$

where $e_m^0$ and $\sigma_0^2$ represent the residue computed at the time of sample m of the frame and the variance of the long-term model, $e_m^1$ and $\sigma_1^2$ likewise representing the residue and the variance of the short-term model. The closer the two models, the closer the statistical test value $w_m$ to 0. In contrast, if the two models are far away from each other, the value $w_m$ becomes negative, which denotes a break R in the signal.

Figure 10:
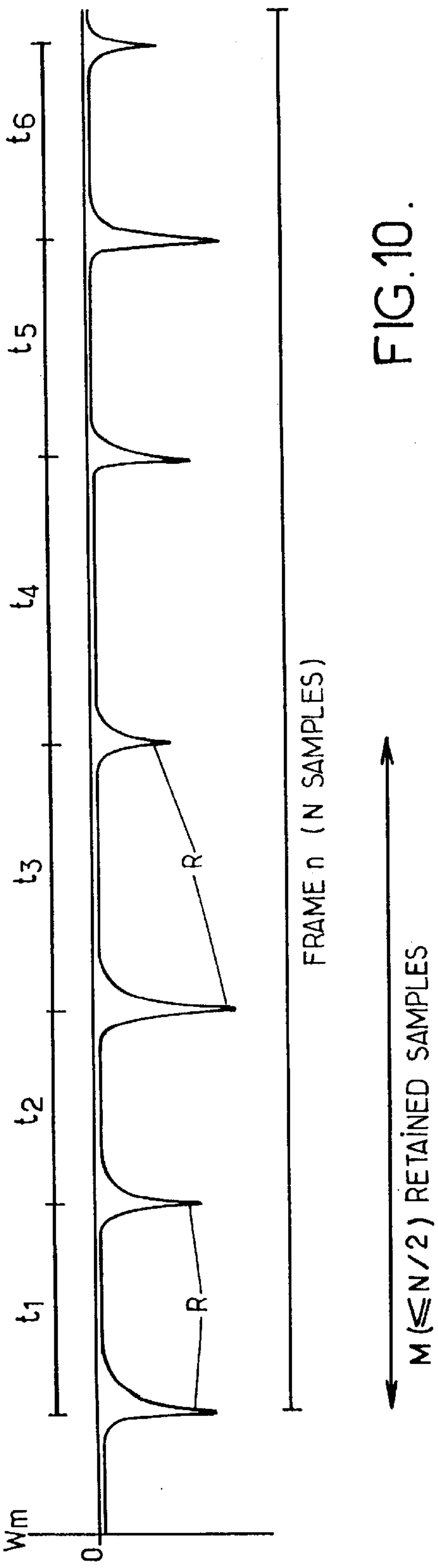
FIG. 10 is a graph illustrating a harmonic analysis method that can be used in a method according to the invention.

Thus FIG. 10 shows one possible example of the evolution of the value $w_m$. showing the breaks R in the speech signal. The time intervals $t_r$ (r=1,2, etc.) between two consecutive breaks R are computed and expressed as a number of samples of the speech signal. Each interval $t_r$ is inversely proportional to the pitch frequency $f_p$, which is thus estimated locally: $f_p=F_e/t_r$ over the r-th interval.

The time variations of the pitch (i.e. the fact that the intervals $t_r$ are not all equal over a given frame), can then be corrected to obtain a constant pitch frequency in each of the analysis frames. This correction is effected by modifying the sampling frequency over each interval $t_r$ to obtain constant intervals between two glottal closures after oversampling. Thus the duration between two breaks is modified by oversampling with a variable ratio, so as to lock onto the greatest interval. Also, the conditioning constraint, whereby the oversampling frequency is a multiple of the estimated pitch frequency, is complied with.

Figure 11:
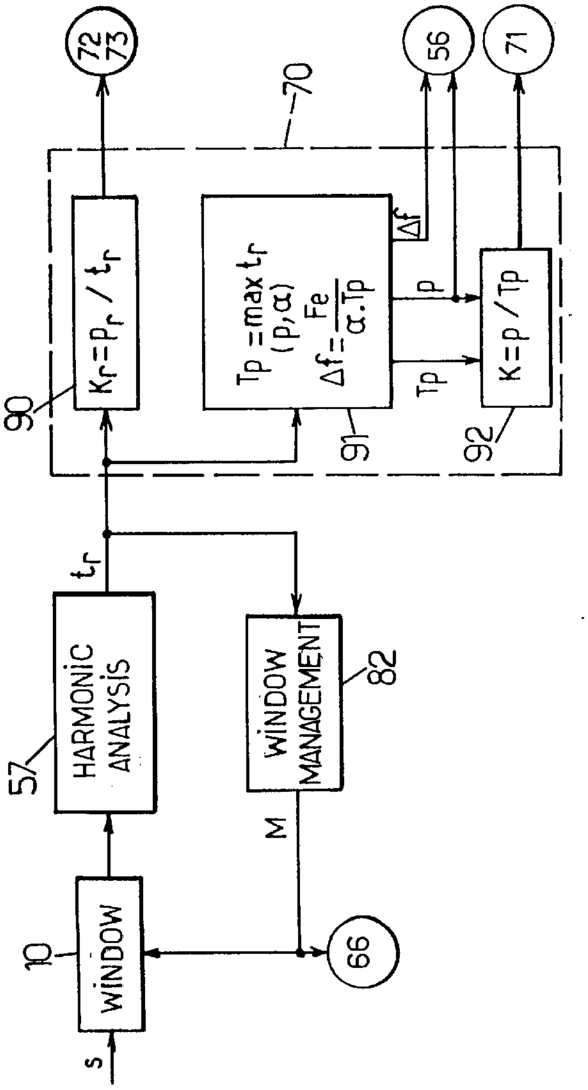
FIG. 11 shows part of a variant of the block diagram shown in FIG. 9.

FIG. 11 shows the means employed to perform the conditioning of the signal in the latter case. The harmonic analysis module 57 uses the above analysis method and supplies the intervals $t_r$ relating to the signal frame produced by the module 10. For each of these intervals, the module 70 (block 90 in FIG. 11) computes the oversampling ratio $K_r=P_r/t_r$, where the integer $P_r$ is given by the third column of table I if $t_r$ takes the values indicated in the second column. These oversampling ratios $K_r$ are supplied to the frequency changer modules 72 and 73 so that the interpolations are effected with the sampling ratio $K_r$ over the corresponding time interval $t_r$.

The greatest time interval $T_p$ of the time intervals $t_r$ supplied by the module 57 for a frame is selected by the module 70 (block 91 in FIG. 11) to obtain a pair p,α as indicated in table I. The modified sampling frequency is then $f_e=p\cdot F_e/T_p$ as previously, the spectral resolution Δf of the discrete Fourier transform of the conditioned signal still being given by $\Delta f=F_e/(\alpha\cdot T_p)$. For the frequency changer module 71, the oversampling ratio K is given by $K=p/T_p$ (block 92). The module 56 for protecting the pitch harmonics operates in the same manner as before, using for condition (9) the spectral resolution Δf supplied by the block 91 and the pitch frequency $f_p=f_e/p$ defined according to the value of the integer delay p supplied by the block 91.

This embodiment of the invention also implies adaptation of the window management module 82. The number M of samples of the noise-suppressed signal to be retained over the current frame here corresponds to an integer number of consecutive time intervals $t_r$ between two glottal closures (see FIG. 10). This avoids the problems of phase discontinuity between frames, whilst allowing for possible variations of the time intervals $t_r$ over a frame.

What is claimed is:

1. Method of suppressing noise in a digital speech signal processed by successive frames, comprising the steps of:

computing spectral components of the speech signal of each frame;

computing, for each frame, overestimates of spectral components of noise included in the speech signal; and performing a spectral subtraction including a first subtraction step in which a respective first quantity dependent on parameters including the overestimate of a corresponding spectral component of the noise for said frame is subtracted from each spectral component of the speech signal of the frame, to obtain spectral components of a first noise-suppressed signal;

computing a masking curve by applying an auditory perception model on the basis of the spectral components of the first noise-suppressed signal;

comparing the overestimates of the spectral components of the noise for the frame to the computed masking curve; and a second subtraction step in which a respective second quantity depending on parameters including a difference between the overestimate of the corresponding spectral component of the noise and the computed masking curve is subtracted from each spectral component of the speech signal of the frame.

2. Method according to claim 1, wherein said second quantity relating to a spectral component of the speech signal of the frame is substantially equal to whichever is the lower of the corresponding first quantity and a fraction of the overestimate of the corresponding spectral component of the noise which exceeds the masking curve.

3. Method according to claim 1, comprising the step of performing a harmonic analysis of the speech signal to estimate a pitch frequency of the speech signal in each frame in which the speech signal features vocal activity.

4. Method according to claim 3, wherein the parameters on which the first subtracted quantities depend include the estimated pitch frequency.

5. Method according to claim 4, wherein the first quantity subtracted from a spectral component of the speech signal is lower if said spectral component corresponds to a frequency closest to an integer multiple of the estimated pitch frequency than if said spectral component does not correspond to a frequency closest to an integer multiple of the estimated pitch frequency.

6. Method according to claim 4, wherein the respective quantities subtracted from the spectral components of the speech signal corresponding to frequencies closest to integer multiples of the estimated pitch frequency are substantially zero.

7. Method according to claim 3, wherein, after estimating the pitch frequency of the speech signal in a frame, the speech signal of the frame is conditioned by oversampling the speech signal at an oversampling frequency which is a multiple of the estimated pitch frequency and the spectral components of the speech signal are computed for the frame on the basis of the conditioned signal to subtract said quantities therefrom.

8. Method according to claim 7, wherein spectral components of the speech signal are computed by distributing the conditioned signal into blocks of N samples transformed into the frequency domain and wherein the ratio between the oversampling frequency and the estimated pitch frequency is a factor of the number N.

9. Method according to claim 7, wherein a degree of voicing of the speech signal is estimated for the frame on the basis of an entropy of an autocorrelation of the spectral components computed on the basis of the conditioned signal.

10. Method according to claim 9, wherein said spectral components whose autocorrelation is computed are those computed on the basis of the conditioned signal after subtraction of said first quantities.

11. Method according to claim 9, wherein the degree of voicing is measured on the basis of a normalized entropy of the form:

$$H = \frac{\sum_{k=0}^{N/2-1} A(k)\cdot\log[A(k)]}{\log(N/2)}$$

where N is the number of samples used to calculate the spectral components on the basis of the conditioned signal and A(k) is the normalized autocorrelation defined by:

$$A(k) = \frac{\sum_{f=0}^{N/2-1} S_{n,f}^2 \cdot S_{n,f+k}^2}{\sum_{f=0}^{N/2-1}\sum_{f'=0}^{N/2-1} S_{n,f}^2 \cdot S_{n,f+f'}^2}$$

$S_{n,f}^2$ designating the spectral component of rank f computed on the basis of the conditioned signal.

12. Method according to claim 11, wherein the computation of the masking curve uses the degree of voicing measured by the normalized entropy H.

13. Method according claim 3, wherein, after processing each frame, a number of the samples of the noise-suppressed speech signal supplied by such processing is retained which is equal to an integer multiple of a ratio between the sampling frequency and the estimated pitch frequency.

14. Method according to claim 3, wherein the estimation of the pitch frequency of the speech signal over a frame includes the steps of:

estimating time intervals between two consecutive breaks of the signal which can be attributed to glottal closures of the speaker occurring during the frame, the estimated pitch frequency being inversely proportional to said time intervals; and interpolating the speech signal in said time intervals so that the conditioned signal resulting from such interpolation has a constant time interval between two consecutive breaks.

15. Method according to claim 14, wherein, after processing each frame, a number of the noise-suppressed speech signal samples supplied by such processing is retained which corresponds to an integer number of estimated time intervals.

16. Method according to claim 1, wherein values of a signal-to-noise ratio of the speech signal are estimated in the spectral domain for each frame and the parameters on which the first subtracted quantities depend include the estimated values of the signal-to-noise ratio, the first quantity subtracted from each spectral component of the speech signal in the frame being a decreasing function of the corresponding estimated value of the signal-to-noise ratio.

17. Method according to claim 16, wherein said function decreases toward zero for the highest values of the signal-to-noise ratio.

18. Method according to claim 1, further comprising the step of subjecting a result of the spectral subtraction to a transformation to the time domain to construct a noise-suppressed speech signal.

19. Device for suppressing noise in a digital speech signal processed by successive frames, comprising:

means for computing spectral components of the speech signal for each frame;

means for computing, for each frame, overestimates of spectral components of noise included in the speech signal; and spectral subtraction means including:

first subtraction means to subtract, from each spectral component of the speech signal of the frame, a respective first quantity dependent on parameters including the overestimate of a corresponding spectral component of the noise for said frame, to obtain spectral components of a first noise-suppressed signal;

means for computing a masking curve by applying an auditory perception model on the basis of the spectral components of the first noise-suppressed signal;

means for comparing the overestimates of the spectral components of the noise for the frame to the computed masking curve; and second subtraction means to subtract, from each spectral component of the speech signal of the frame, a respective second quantity depending on parameters including a difference between the overestimate of the corresponding spectral component of the noise and the computed masking curve.

20. Device according to claim 19, wherein said second quantity relating to a spectral component of the speech signal of the frame is substantially equal to whichever is the lower of the corresponding first quantity and a fraction of the overestimate of the corresponding spectral component of the noise which exceeds the masking curve.

21. Device according to claim 19, further comprising harmonic analysis means for estimating a pitch frequency of the speech signal in each frame in which said speech signal features vocal activity, and wherein the parameters on which the first subtracted quantities depend include the estimated pitch frequency.

* * * * *